United States Patent

[11] 3,564,193

| [72] | Inventor | Paul M. Erlandson |
| | | Palos Park, Ill. |
| [21] | Appl. No. | 716,855 |
| [22] | Filed | Mar. 28, 1968 |
| [45] | Patented | Feb. 16, 1971 |
| [73] | Assignee | Continental Can Company, Inc. |
| | | New York, N.Y. |

[54] DIRECT CURRENT WELDING SYSTEM HAVING MINIMUM INDUCTANCE
7 Claims, 2 Drawing Figs.

[52] U.S. Cl. .................................................. 219/108
[51] Int. Cl. .................................................. B23k 11/26
[50] Field of Search .......................................... 219/108,
    111, 112, 116; 307/136; 317/16; 174/117.11

[56] References Cited
UNITED STATES PATENTS
| 2,452,573 | 11/1948 | Johson et al. | 219/108 |
| 2,478,527 | 8/1949 | Dawson et al. | 219/108 |
| 2,742,552 | 4/1956 | Riley | 219/108 |

OTHER REFERENCES
" Laminated and Molded Bus Bars for Power Distribution," Technical Bulletin B—1, Eldre Components, Inc, Received in U.S. Patent Office on March 17, 1965 pgs. 6— 11.

Primary Examiner—J. V. Truhe
Assistant Examiner—J. G. Smith
Attorney—Petherbridge, O'Neill & Lindgren ABSTRACT: An electrical resistance direct current welding system is disclosed including circuitry providing low inductance and having switching means connected adjacent the welding electrodes whereby the current flow to the electrodes may be interrupted with no damaging arc resulting.

PATENTED FEB 16 1971
3,564,193
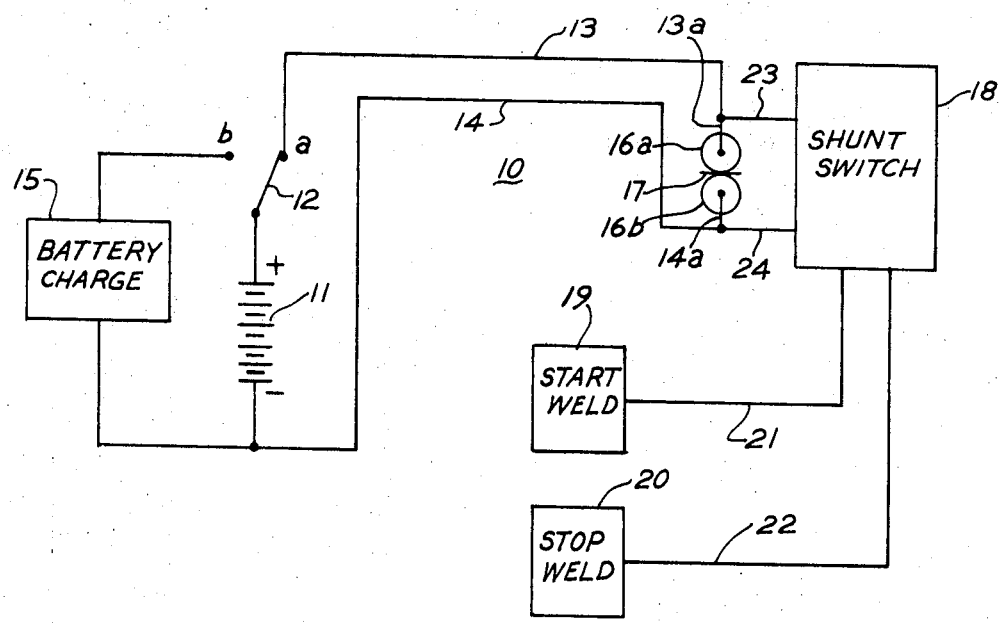
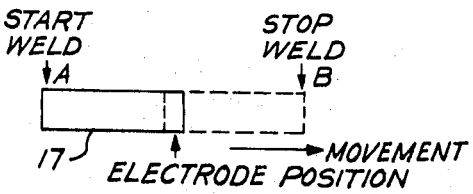
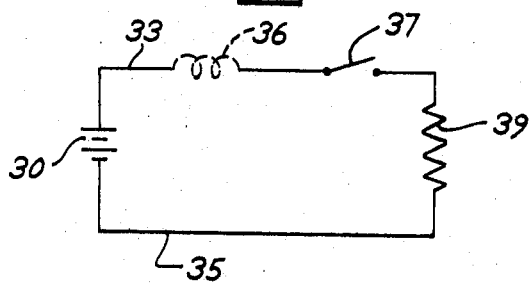
INVENTOR
PAUL M. ERLANDSON
BY
Petherbridge, O'Neill & Aubel
ATTORNEYS

DIRECT CURRENT WELDING SYSTEM HAVING MINIMUM INDUCTANCE

The invention is directed to a direct current electrical resistance welding system for welding metal blanks serially or in succession.

Proposals have been made in the prior art to use direct current in an electrical resistance welding system. However, in using direct current welding circuits, it has been found that the switching or interrupting of the direct current to the welding electrodes may result in severe arcing problems. And, more specifically, it has been found that the switching of direct current at a high repetition rate has caused electrode arcing which, in turn, causes electrode wear, hot welds, and generally produces inferior welding results.

Various apparatus and methods such as, for example, those shown in U.S. Pat. No. 2,433,678 have been proposed for solving the problem of arcing. However, as far as is known, none of the prior art has adequately solved the problem of switching a direct current to welding electrodes ON and OFF at a high repetition rate.

Heretofore, efforts to control the arcing of the welding electrodes of a direct current system have not included a consideration of the effect of the inductance which may be present or introduced by the electrical circuit connected to the welding electrodes, and by the welding electrodes themselves. In accordance with the principles of this invention, to be hereinafter explained, a direct current welding system and circuitry therefor are provided which circuitry has a very low inductance. Thus, when the current flowing through the invention circuit is interrupted, there is no damaging arcing because no transient voltage or voltage surge is developed as would be the case if the circuit included appreciable inductive impedance.

Accordingly, an object of this invention is to provide an electrical apparatus and circuitry providing a low inductive impedance path to a welding load. In particular, the apparatus and circuitry of the invention provides current carrying conductors connected and positioned to develop a minimum inductance such that a minimal amount of energy is stored in the magnetic field of the circuitry; and, hence, when the circuit to the welding electrodes is opened or interrupted the voltage at the electrodes will not rise appreciably.

The nature of the invention will be more clearly understood by reference to the following detailed description, the appended claims, and the illustrated accompanying drawings.

IN THE DRAWINGS

FIG. 1 discloses a welding s system in accordance with the invention showing current conductors positioned close to one another to minimize the inductance of the circuit.

FIG. 1A is a sketch showing the positioning of the welding electrodes in relation to the start and stop weld sensing means and in relation to a metal blank moving past.

FIG. 2 is a sketch of the electrical circuit useful in explaining the operation of the circuit of FIG. 1.

Before considering the inventive circuit of FIG. 1, consider, for purposes of explanation, the circuit of FIG. 2 which shows a battery 30 connected through suitable conductive leads 33, 35 and a knife switch 37 to a resistive load 39. An inductor 36 may be connected in the circuit as indicated. Assume that the circuit parameters are such that when switch 37 is closed a battery voltage of 10 volts causes a current $I$ of $10^4$ amperes to flow in the circuit. Assuming the inductor 36 has an inductance or inductive value $L$ of $10^{-5}$ henry, then there is an energy stored in the magnetic field of inductance $L$ given by the formula, $E = \frac{1}{2}LI^2 = \frac{1}{2}(10^{-5})(10^4)^2 = 500$ joules.

If the switch 37 is opened, the stored energy must be dissipated since it will not remain stored in the magnetic field of the inductor.

The voltage surge $V$ induced in the inductance $L$ by the collapse of the magnetic field may be given by the relation, $V = L\, di/dt$ where $di/dt$ is the change of current with respect to time; i.e., the switching time.

Thus, the faster the switch 37 is opened, the higher will be the peak voltage developed and the higher will be the peak power $P$ developed. As an example, if the current $I$ of $10^4$ amperes is interrupted in $10^{-3}$ seconds; then, $L\, di/dt = (10^{-5})(10^4/10^{-3}) = 100$ volts, and $P = VI = (100)(10^4) = 10^6$ watts.

Thus, the voltage peak or "surge" developed in an inductive circuit can be appreciable in comparison to the circuit operating voltage of 10 volts. Normally, the higher the peak power developed, the more severe or damaging will be the arcing developed as the switch is opened.

Assume next that the inductor 36 is not connected in the circuit of FIG. 2 and that a purely resistive circuit is feeding a current of $10^4$ amperes to a purely resistive load 39; thus, the inductance L of the circuit is zero and, therefore, $L\, di/dt = 0$. Accordingly, the theoretical voltage surge in the foregoing case will be zero. Since, however, the inductance of the circuit always has a finite value there will be some amount of energy which must be dissipated.

Thus, it follows from the above, that in order for the voltage surge to be low; either the inductance $L$ of the circuit must be low; or, the switching time, that is, the $di/dt$ must be of relatively long duration.

In one commercial application of the invention, can body blanks, one of which is indicated by a solid line 17 in FIG. 1, move at a high rate of speed past the welding electrodes to be seam welded. In this application, it is necessary to switch the direct current OFF very sharply to thereby stop the weld seam at a precise point on the blank, and/or to stop the current flow between blanks. It follows, therefore, that in relation to the above formula, $L\, di/dt$; the switching time must be relatively fast, hence the $di/dt$ factor must of necessity remain large. Accordingly, the other factor in the formula; that is, the inductance $L$, must be minimized in order to minimize any voltage surge due to the switching action.

FIG. 1 shows a direct current electrical resistance welding system 10, in accordance with the invention, wherein the total inductance of the circuit is minimized to eliminate damaging arcing of the welding electrodes. In FIG. 1, a battery 11, which may comprise a large single battery or a bank of cells, has its positive pole coupled through a terminal $a$ of a switch 12 and a conductor 13, which may comprise a bus bar (preferably of copper), and a conductive lead 13a to a first welding electrode 16a. A metal blank 17 which may comprise the cylindrical portion of a can body is inserted through welding electrode 16a and a cooperating electrode 16b to be welded thereby, as is well known in the art. The can body blank 17 moves through the electrodes 16a and 16b at a high rate of speed; for example, in one embodiment, up to 10 cans per second were welded.

Electrode 16b is electrically connected through lead 14a and a conductor 14, which may comprise a bus bar (preferably of copper) to the negative pole of the battery 11.

While welding electrodes 16a and 16b are shown as being roller electrodes, other suitable type electrodes could likewise be employed. Note, that for purposes of this description, electrodes 16a and 16b will also be referred to herein generally as electrodes 16.

A shunt switch 18 is connected through conductive lead 23 to an electrical terminal point immediately adjacent electrode 16a and through conductive lead 24 to an electrical terminal point immediately adjacent electrode 16b. The shunt switch 18 is connected through conductive leads 21 and 22, respectively, to a start weld circuit 19 and a stop weld circuit 20. The operation of the shunt switch 18, the start weld circuit 19, and the stop weld circuit 20 will be described hereinbelow.

A battery charger 15, of any suitable known type, may be selectively connected through a terminal $b$ of switch 12 to charge the battery 11. The switch 12 may be actuated manually or automatically as by timing means, as is well known in the art.

As shown in FIG. 1, the direct current carrying bus bars 13 and 14 are positioned close, and parallel to, each other. It has been found that, in one embodiment, wherein the circuit voltage is in the order of 10 volts and the current is in the order of 6,000 amperes, bus bars 13 and 14 may be spaced as close as 0.0001 inches apart, provided suitable insulation is placed therebetween. As described hereinabove, positioning of the bus bars 13 and 14 as shown minimizes the inductance of the bus bars 13 and 14, or, more specifically, the strength or magnitude of the magnetic field developed by the current flowing in the bus bars is minimized. Accordingly, the inductance $L$ in the formula $L\, di/dt$, discussed above, has been reduced such that the peak voltage surge developed as the switching action is performed will not go above a preselected low level.

The leads 23 and 24 to shunt switch 18 are connected immediately adjacent the welding electrodes 16a and 16b, respectively. In this manner, the inductance contributed to the circuit by the leads 13a and 14a and by the electrical connections to the welding electrodes 16 is also minimized.

The shunt switch 18 may comprise an electronic switch having a bank of transistors which are activated to current conducting (ON) and current nonconducting (OFF) conditions by the start weld circuit 19 and the stop weld circuit 20. The start weld 19 and stop weld 20 circuits are responsive to the position and movement of the blanks past the welding electrodes 16. The shunt switch 18, when activated to a current conducting (ON) condition, functions to shunt or bypass a major portion of the welding current around the welding electrodes 16 to stop the welding operation. When the shunt switch 18 is in a nonconducting (OFF) condition, the current from the battery 11 is caused to flow through the welding electrodes 16 to enable the welding operation to be performed on the blank 17 which is moving through the welding electrodes.

The start weld and stop weld circuits 19 and 20 may each comprise a phototransistor actuated by an associated lamp or source of light ray when the can 17 to be welded moves past a selected position (see FIG. 1A), as is known in the art. For example, at the time a blank 17 moves past position A, the circuitry of start weld circuit 19 is energized to provide a signal to actuate shunt switch 18 to turn OFF and permit the welding current to flow through the welding electrodes 16 to perform the welding operation on the blank. After the blank 17 moves past the electrodes 16 to the position B, shown in FIG. 1A, the stop weld circuit 20 will be actuated to cause the shunt switch 18 to become conductive and shunt or bypass the signal around the welding electrodes 16.

Accordingly, when the current flowing through the welding electrodes 16 of FIG. 1 is interrupted, the operation will be theoretically similar to the case described for FIG. 2 in which a minimum inductance is present in the circuit and the voltage surge developed by the switching action will be minimal resulting in a minimum of arcing between the electrodes.

Further, the circuit of the invention permits the current flowing through the welding electrodes to be precisely controlled to turn ON and OFF to control the point at which the seam weld starts on each blank and also for purposes of interrupting or stopping the current flow between the moving blanks. Note, that in the circuit of FIG. 1, the welding current flowing through the electrodes 16 need not be turned completely OFF, but may be merely reduced below the amplitude where welding will occur.

While FIG. 1 shows a shunt switch 18 connected to interrupt the current flow through electrodes 16, a series switch connected in leads 13a or 14a might be used in lieu thereof.

Although the invention has been particularly shown and described with reference to preferred embodiments thereof, it will be understood by those skilled in the art that various changes in form and details may be made therein without departing from the spirit and scope of the invention.

I claim:

1. A circuit for coupling a source of direct current to an electrical resistance seam welding system wherein the blanks to be welded move past a pair of cooperating welding electrodes to be welded thereby comprising, in combination: a pair of electrical conductors for coupling the direct current to the electrodes, the conductors being position in approximate parallel relation and close to each other to minimize inductance in the circuit, switching means for selectively reducing the current flowing from the source through the conductors to the electrodes, switching contact points on said conductors connecting the switching means in shunt with the electrodes, the switching points being located for minimizing the length of the conductor connecting the electrodes to the switching points, whereby when the switching means is actuated to reduce the current flow a minimal voltage surge is developed and damaging arcing across the electrodes is prevented.

2. An electrical resistance seam welding system comprising, in combination: a pair of cooperating welding electrodes arranged for welding blanks moving in succession thereby, a direct current source connectable to provide a substantially constant voltage energization to the system, a pair of electrical conductors for coupling said source to the electrodes, the conductors being positioned in parallel relation with each other at a minimum distance apart to minimize the value of the inductance $L$ thereof, switching means for selectively reducing the current $I$ to said electrodes as a function $di/dt$ representing the change of current with respect to time, switching means having electrically opened and closed current conducting conditions, switching contact points on the conductors for connecting said switching means in shunt with the electrodes, the switching contact points being located adjacent the electrodes for minimizing the length of the conductors which are connected between the electrodes and the switching points, whereby the peak power $P = (L\, di/dt)(I)$ developed as the switch is actuated is minimized due to the low value of inductance $L$ to thereby reduce arcing of the welding electrodes.

3. An electrical resistance welding system comprising, in combination: a pair of cooperating welding electrodes for welding blanks moving in succession thereby, a direct current source connectable to provide a constant voltage energization to said system, a pair of electrical conductors for coupling said source to said electrodes, said conductors coupling the source to said electrodes being positioned in approximate parallel relation with each other and closely adjacent to each other to minimize the inductance thereof, switching means having electrically open and closed current conducting conditions, switching contact points on said conductors for connecting said switching means in shunt with the electrodes, the switching contact points being located adjacent the electrodes for minimizing the length of the conductors which are connected between the electrodes and the switching points, whereby the inductance of the circuit is minimized and consequently during the switching operation arcing across said electrodes is minimized; and, first and second sensing means positioned in spaced relation to one another and each being responsive to the movement of said blanks relative to said electrodes, said first and second sensing means connected to control said switching means to respective closed and opened electrical conditions, said switching means when open, permitting current to flow through said electrodes to perform a welding operation and when closed reducing the current flow through said electrodes to terminate said welding operation.

4. A welding system as in claim 3 wherein said sensing means comprise phototransistors and associated sources of light mounted transverse to the path of said moving blanks.

5. A welding system as in claim 4 wherein said electrodes are roller electrodes, and said conductors are spaced one-thousandths of an inch apart.

6. An electrical resistance welding system comprising, in combination: a pair of cooperating welding electrodes for welding moving blanks in succession, a direct current source connectable to provide a substantially constant voltage energization to said system, a pair of electrical conductors for coupling said source to said electrodes, said conductors being positioned in approximate parallel relation with each other and close to each other to minimize the inductance in the circuit, switching means for selectively reducing the current to said electrodes, switching contact points on said conductors, conductive leads for connecting said switching means in shunt with the electrodes, said switching contact points being located adjacent the electrodes for minimizing the length of the conductors which are connected between the electrodes and the switching points, and the length of said conductive leads connecting said switching contact points to said switching means also being minimized, whereby damaging arcing across said electrodes during the switching operation is prevented.

7. A welding system as in claim 6 wherein said switching means comprise an electronic switch connected in shunt with said electrodes, and said switching means is actuated to ON and OFF conducting conditions to selectively shunt a major portion of the current around said electrodes and to permit all the current to flow through said electrodes.

UNITED STATES PATENT OFFICE
CERTIFICATE OF CORRECTION

Patent No. 3,564,193     Dated February 16, 1971

Inventor(s)    Paul M. Erlandson

It is certified that error appears in the above-identified patent and that said Letters Patent are hereby corrected as shown below:

Column 1, line 32, "vention" should read -- ventive --  line 50, "welding s system" should read -- welding system --  Column 3, line 3, "6.000" should read -- 6,000 --. Column 4, line 1, "position" should read -- positioned --.

Signed and sealed this 17th day of August 1971.

(SEAL)
Attest:

EDWARD M. FLETCHER, JR.            WILLIAM E. SCHUYLER,
Attesting Officer                     Commissioner of Patents